US012686252B2

(12) United States Patent
Mao

(10) Patent No.: US 12,686,252 B2
(45) Date of Patent: Jul. 21, 2026

(54) SUNSHADE

(71) Applicant: Yuen Mao, San Diego, CA (US)

(72) Inventor: Yuen Mao, San Diego, CA (US)

( * ) Notice: Subject to any disclaimer, the term of this patent is extended or adjusted under 35 U.S.C. 154(b) by 157 days.

(21) Appl. No.: 18/418,886

(22) Filed: Jan. 22, 2024

(65) Prior Publication Data

US 2024/0246398 A1 Jul. 25, 2024

Related U.S. Application Data

(60) Provisional application No. 63/440,394, filed on Jan. 21, 2023.

(51) Int. Cl.
*B60J 1/20* (2006.01)

(52) U.S. Cl.
CPC ........... *B60J 1/2077* (2013.01); *B60J 1/2038* (2013.01); *B60J 1/2047* (2013.01); *B60J 1/2069* (2013.01)

(58) Field of Classification Search
CPC ...... B60J 1/2077; B60J 1/2063; B60J 1/2069; B60J 1/2038; B60J 1/2047; B60J 1/2041; B60J 1/2044
See application file for complete search history.

(56) References Cited

U.S. PATENT DOCUMENTS

| | | | | | |
|---|---|---|---|---|---|
| 1,351,403 | A | * | 8/1920 | Sager | B60J 1/2069 |
| | | | | | 296/143 |
| 2,486,568 | A | * | 11/1949 | Lukaszevig | E06B 9/54 |
| | | | | | 160/25 |
| 2,498,094 | A | * | 2/1950 | Plaum | E06B 9/54 |
| | | | | | 160/250 |
| 2,594,386 | A | * | 4/1952 | Blessen | B60J 1/2047 |
| | | | | | 296/97.7 |
| 5,016,937 | A | * | 5/1991 | White | B60J 11/08 |
| | | | | | 160/370.21 |
| 5,064,238 | A | * | 11/1991 | Mohtasham | B60J 1/2069 |
| | | | | | 296/97.7 |
| 5,098,149 | A | * | 3/1992 | Lee | B60J 1/2063 |
| | | | | | 160/370.22 |
| 5,495,884 | A | * | 3/1996 | Shikler | B60J 1/208 |
| | | | | | 248/205.5 |
| 6,460,593 | B1 | * | 10/2002 | Floyd | E06B 9/40 |
| | | | | | 296/97.7 |

(Continued)

*Primary Examiner* — Abe Massad

(74) *Attorney, Agent, or Firm* — CP LAW GROUP PC; Cy Bates

(57) ABSTRACT

The disclosure concerns a sunshade have a collapsible body with a first elongated compartment and a second elongated compartment slidably coupled to the first elongated compartment. A first retractable substrate is coupled to the first elongated compartment where the first retractable substrate is configured to retract within the first elongated compartment. Likewise, a second retractable substrate is coupled to the second elongated compartment where the second retractable substrate is configured to retract within the second elongated compartment. A first and second attachment components are coupled to the first and second retractable substrates, respectively. The first and second attachment components are configured to engage with clips disposed on visors of a vehicle for maintaining the first and second retractable substrates in a deployed state for covering a windshield of the vehicle for blocking sunlight and heat.

20 Claims, 10 Drawing Sheets

100

203

(56)  References Cited

U.S. PATENT DOCUMENTS

| 6,477,744 | B1 * | 11/2002 | Miles | B43K 23/002 |
| | | | | 24/3.12 |
| 7,143,805 | B1 * | 12/2006 | Weir | B60J 1/2069 |
| | | | | 160/370.22 |
| 9,878,601 | B2 * | 1/2018 | Chen | B60J 3/0234 |
| 10,160,294 | B1 * | 12/2018 | Pettit | B60J 1/2047 |
| 10,807,447 | B1 * | 10/2020 | Pettit | B60J 1/2063 |
| 2005/0236863 | A1 * | 10/2005 | Lee | B60J 1/2044 |
| | | | | 296/97.4 |
| 2010/0013262 | A1 * | 1/2010 | Shu | B60J 1/2041 |
| | | | | 296/97.8 |
| 2012/0049564 | A1 * | 3/2012 | Haase | B60J 1/2041 |
| | | | | 160/370.21 |
| 2018/0272842 | A1 * | 9/2018 | Mao | B60J 1/2041 |

* cited by examiner

150

SUNSHADE

CROSS-REFERENCE TO RELATED APPLICATIONS

This application claims benefit of priority with U.S. Provisional Application Ser. No. 63/440,394, filed Jan. 21, 2023; the entire contents of which are hereby incorporated by reference.

BACKGROUND

Field of the Invention

This invention relates to sunshades; more particularly, sunshades with retractable substrates for easy deployment.

Description of the Related Art

Sunshades are a common item used in vehicles for covering windshield in order to block sunlight and heat from entering a vehicle. Conventional designs include a foldable substrate that can be stored on a floor or backseat of a vehicle during operation of the vehicle. When an operator parks their vehicle, they would unfold the conventional sunshade and install it over the windshield before use. To take the conventional sunshade down to operate the vehicle, the operator would have to remove the entire sunshade from the dashboard and manually fold it down for storage. This process can be inconvenient for continuously needing to install and uninstall the conventional sunshade each time. There is a need for a sunshade that can be more conveniently used for blocking sunlight.

SUMMARY

The disclosure concerns a sunshade have a collapsible body with a first elongated compartment and a second elongated compartment slidably coupled to the first elongated compartment. A first retractable substrate is coupled to the first elongated compartment where the first retractable substrate is configured to retract within the first elongated compartment. Likewise, a second retractable substrate is coupled to the second elongated compartment where the second retractable substrate is configured to retract within the second elongated compartment. A first and second attachment components are coupled to the first and second retractable substrates, respectively. The first and second attachment components are configured to engage with clips disposed on visors of a vehicle for maintaining the first and second retractable substrates in a deployed state for covering a windshield of the vehicle for blocking sunlight and heat.

BRIEF DESCRIPTION OF THE DRAWINGS

Other features, combinations, and embodiments will be appreciated by one having the ordinary level of skill in the art of sunshades upon a thorough review of the following details and descriptions, particularly when reviewed in conjunction with the drawings, wherein.

DETAILED DESCRIPTION

Figure 1:
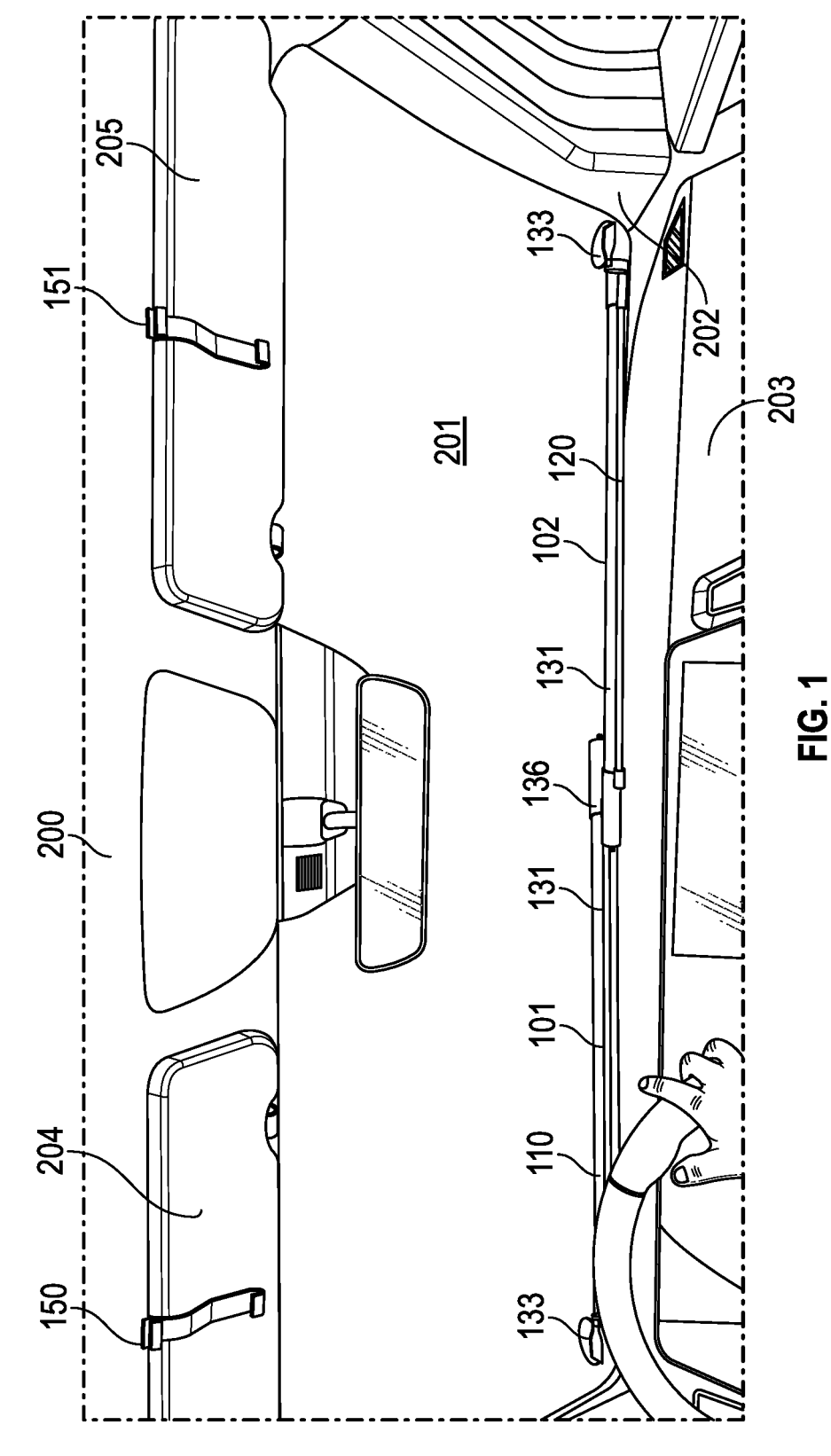
FIG. 1 shows an interior view of a sunshade disposed in a vehicle with retractable substrates in a retracted state in accordance with a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

Unless explicitly defined herein, terms are to be construed in accordance with the plain and ordinary meaning as would be appreciated by one having skill in the art.

GENERAL DESCRIPTION OF EMBODIMENTS

In one aspect, a method of using a sunshade is disclosed. The method comprises: (i) attaching a clip to each visor of a vehicle; (ii) placing the sunshade on a dashboard of the vehicle; (iii) expanding the sunshade by sliding a first elongated compartment of the sunshade linearly away from a second elongated compartment of the sunshade; (iv) engaging a coupler element disposed on each of the first and second elongated compartments to a windshield of the vehicle; (v) deploying a first retractable substrate from the first elongated compartment and attaching the first retractable substrate to one of the clips attached to each visor; and (vi) deploying a second retractable substrate from the second elongated compartment and attaching the second retractable substrate to another of the clips attached to each visor.

In some aspects, the coupler elements comprise a suction cup

In one embodiment, a sunshade is disclosed. The sunshade comprises a collapsible body having a first elongated compartment and a second elongated compartment slidably coupled to the first elongated compartment, the first elongated compartment comprising a first inner end and a first outer end opposite the first inner end, and the second elongated compartment comprises a second inner end and a second outer end opposite the second inner end. A first retractable substrate is coupled to the first elongated compartment, the first retractable substrate configured to retract within the first elongated compartment. The first retractable substrate comprises a first attachment component coupled to a first upper edge of the first retractable substrate. Additionally, a second retractable substrate is coupled to the second elongated compartment. The second retractable substrate is configured to retract within the second elongated compartment. The second retractable substrate comprises a second attachment component coupled to a second upper edge of the second retractable substrate.

In some embodiments, the first elongated compartment may be configured to translate linearly along the second elongated compartment.

In some embodiments, each of the first and second attachment components may further comprise a finger grip and a catch, wherein the catch is configured to couple to a clip, and the finger grip is configured to deploy and retract the first and second retractable substrates.

In some embodiments, the sunshade may further comprise a coupler element disposed on each of the first outer end and the second outer end. Each of the coupler elements may comprise a suction cup.

In some embodiments, the first retractable substrate may comprise a first reflective surface and the second retractable substrate comprises a second reflective surface.

In some embodiments, the first retractable substrate and the second retractable substrate may each comprise a tapered side. The tapered side may be disposed near the first outer end and the second outer end.

In some embodiments, the first retractable substrate may be coupled to the first elongated compartment at a first lower edge, wherein the first lower edge is disposed opposite the first upper edge.

In some embodiments, the first elongated compartment and the second elongated compartment may comprise a parallel alignment.

In some embodiments, the first inner end further comprising a glass breaking point.

In some embodiments, the first retractable substrate may overlap with the second retractable substrate while in a deployed state.

In some embodiments, the first elongated compartment may be detachably coupled to the second elongated compartment.

In another embodiment, a sunshade kit is disclosed. The sunshade kit comprises a first elongated compartment and a second elongated compartment. The first elongated compartment has a first inner end and a first outer end opposite the first inner end. The second elongated compartment has a second inner end and a second outer end opposite the second inner end The second elongated compartment is configured to slidably couple with the first elongated compartment. A first retractable substrate is coupled to the first elongated compartment, the first retractable substrate configured to retract within the first elongated compartment. The first retractable substrate comprises a first attachment component coupled to a first upper edge of the first retractable substrate. A second retractable substrate is coupled to the second elongated compartment, the second retractable substrate configured to retract within the second elongated compartment. The second retractable substrate comprises a second attachment component coupled to a second upper edge of the second retractable substrate. The kit further comprises a first clip and a second clip.

In some embodiments, the first clip and the second clip may each be configured to couple to visors of a vehicle.

In some embodiments, the first elongated compartment may be configured to translate linearly along the second elongated compartment.

In some embodiments, each of the first and second attachment components may further comprise a finger grip and a catch, wherein the catches are configured to couple to the first clip and the second clip, and the finger grip is configured to deploy and retract the first and second retractable substrates.

In some embodiments, the sunshade kit may further comprise a coupler element disposed on each of the first outer end and the second outer end. The coupler elements may comprise a suction cup.

In some embodiments, the first retractable substrate may comprise a first reflective surface and the second retractable substrate comprises a second reflective surface.

In some embodiments, the first retractable substrate and the second retractable substrate may each comprise a tapered side. The tapered sides may be disposed near the first outer end and the second outer end.

In some embodiments, the first retractable substrate may be coupled to the first elongated compartment at a first lower edge, wherein the first lower edge is disposed opposite the first upper edge.

In some embodiments, the first inner end may further comprise a glass breaking point.

In some embodiments, each of the first clip and the second clip may comprise a curved body extending from a first endpoint a second endpoint, the clip further comprising a hook disposed at the first endpoint. Each of the first clip and the second clip may further comprise a paper holder disposed at the second endpoint, and a pen holder coupled to the curved body between the first endpoint and the second endpoint.

In yet another embodiment, a system of a sunshade installed within a vehicle is disclosed. The system comprises a first clip coupled to a first visor of the vehicle and a second clip coupled to the second visor of the vehicle. A dashboard of the vehicle supports the sunshade, the sunshade comprises a collapsible body having a first elongated compartment and a second elongated compartment slidably coupled to the first elongated compartment, the first elongated compartment comprising a first inner end and a first outer end opposite the first inner end, and the second elongated compartment comprises a second inner end and a second outer end opposite the second inner end, a first retractable substrate coupled to the first elongated compartment, the first retractable substrate configured to retract within the first elongated compartment, the first retractable substrate comprising a first attachment component coupled to a first upper edge of the first retractable substrate, and a second retractable substrate coupled to the second elongated compartment, the second retractable substrate configured to retract within the second elongated compartment, the second retractable substrate comprising a second attachment component coupled to a second upper edge of the second retractable substrate, wherein the first attachment component is coupled to the first clip, and the second attachment component is coupled to the second clip.

In some embodiments, each of the first clip and the second clip may comprise a curved body extending from a first endpoint a second endpoint, the clip further comprising a hook disposed at the first endpoint. The first clip and the second clip may further comprise a paper holder disposed at the second endpoint, and a pen holder coupled to the curved body between the first endpoint and the second endpoint. Each of the first attachment component and the second attachment component may comprise a catch. The catch of the first attachment component and the second attachment component is engaged with the hook of the first clip and the second clip, respectively.

In some embodiments, the sunshade may further comprise a coupler element disposed at each of the first outer end and the second outer end. Each of the coupler elements may further comprise a suction cup, wherein each suction cup is coupled to a windshield of the vehicle.

In some embodiments, the sunshade may further comprise a compartment overlap between first elongated compartment and the second elongated compartment wherein the first retractable substrate overlaps with the second retractable substrate when in a deployed state.

In some embodiments, the first elongated compartment may be configured to translate linearly along the second elongated compartment.

In some embodiments, the first retractable substrate may comprise a first reflective surface and the second retractable substrate comprises a second reflective surface.

In some embodiments, the first retractable substrate and the second retractable substrate may each comprise a tapered side. The tapered sides may be disposed near the first outer end and the second outer end.

In some embodiments, the first retractable substrate may be coupled to the first elongated compartment at a first lower edge, wherein the first lower edge is disposed opposite the first upper edge.

In some embodiments, the first elongated compartment and the second elongated compartment may comprise a parallel alignment.

In some embodiments, the first inner end may further comprise a glass breaking point.

In some embodiments, the first retractable substrate may overlap with the second retractable substrate while in a deployed state.

In some embodiments, the first elongated compartment may be detachably coupled to the second elongated compartment.

Manufacturing

The retractable substrates can be made of various materials including paper, fabric, and other materials known to reflect heat and withstand high temperatures. In one embodiment, the retractable substrates may comprise a polyester chemical fiber, polyethylene film, a polyethylene aluminized film, or a combination thereof.

Each of the components of the sunshade described herein may be manufactured and/or assembled in accordance with the conventional knowledge and level of a person having skill in the art.

While various details, features, combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

Illustrated Embodiment

FIG. 1 shows an interior view of a sunshade (100) disposed in a vehicle (200) with retractable substrates in a retracted state (131). The sunshade comprises a collapsible body (101) having a first elongated compartment (110) and a second elongated compartment (120) where the first elongated compartment is slidably coupled to the second elongated compartment. The sunshade is disposed on a dashboard (203) of the vehicle and the collapsible body is in an expanded configuration (102) where coupler elements (133) disposed on both ends are coupled to a windshield (201) of the vehicle for securing the sunshade in place. Individually disposed inside each the first elongated compartment and the second elongated compartment are retractable substrates (not shown) rolled within the respective elongated compartment when in the retracted state. The retractable substrates are configured to be deployed to cover the windshield and couple to clips (150; 151) disposed on visors (204; 205) of the vehicle. With the retractable substrates in the retracted state as shown illustrates use of the sunshade while an operator is driving the vehicle. Each of the elongated compartments may comprise a retracting bias force that pulls the retractable substrate into the retracted state. Even with the collapsible body in the expanded configuration, a portion of the first elongated compartment overlaps with a portion of the second elongated compartment to form a compartment overlap (136). The compartment overlap ensures the retractable substrates overlap with each other when in a deployed state to provide proper coverage.

Figure 2:
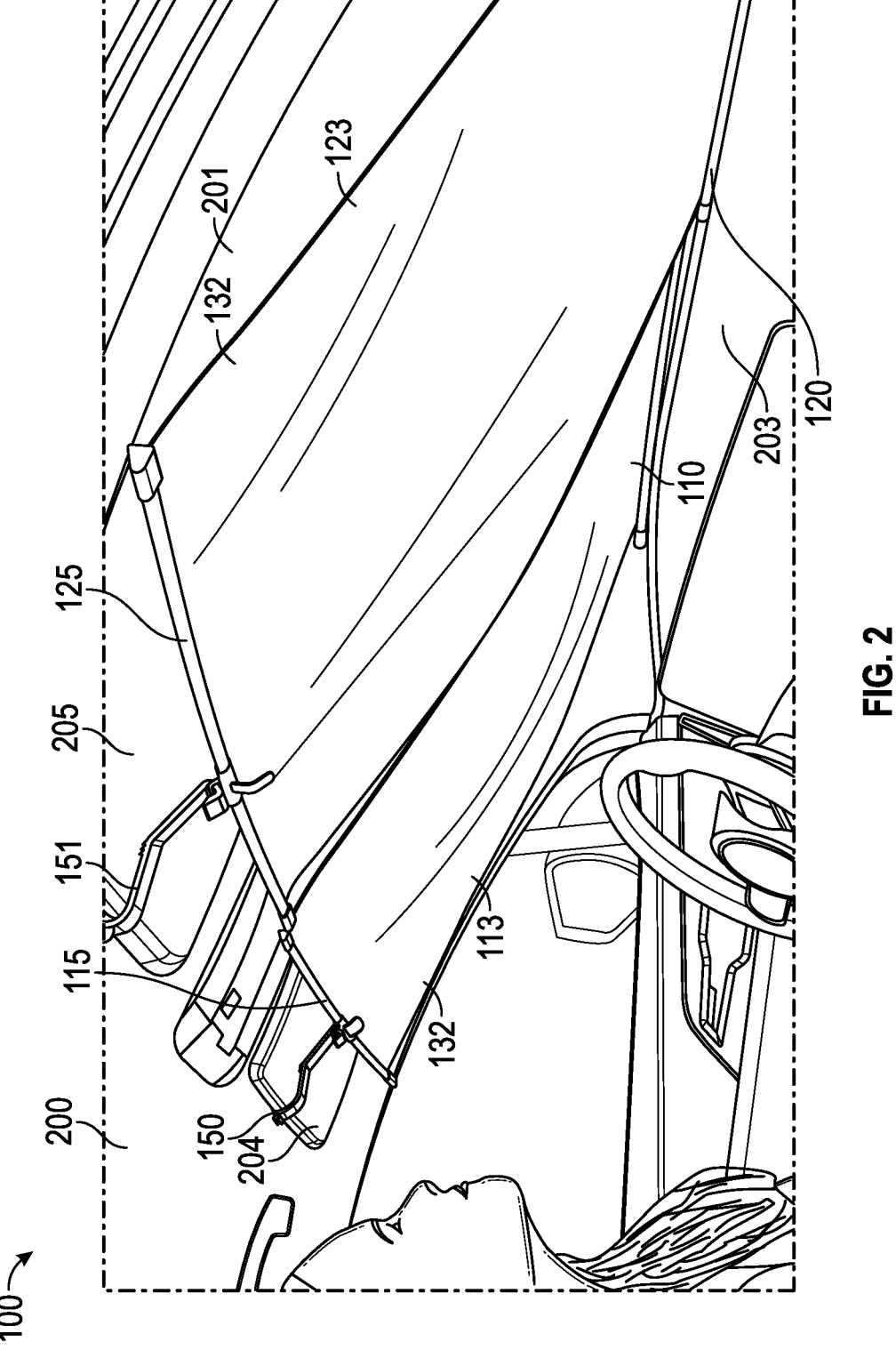
FIG. 2 shows an interior view the sunshade disposed in the vehicle with the retractable substrates in a deployed state according to the first illustrated embodiment.

FIG. 2 shows an interior view the sunshade (100) disposed in the vehicle (200) with retractable substrates each in a deployed state (132). The sunshade comprises a first elongated compartment (110) slidably coupled to a second elongated compartment (120). Both the first and second elongated compartments are disposed on a dashboard (203) of the vehicle. The first elongated compartment comprises a first retractable substrate (113) in the deployed state. The first retractable substrate comprises a first upper edge (115) and a first lower edge (not shown) opposite the first upper edge. The first lower edge couples to an interior of the first elongated compartment and the first upper edge is coupled to a first visor (204) by a first clip (150). Similarly, the second elongated compartment comprises a second retractable substrate (123) in the deployed state. The second retractable substrate comprises a second upper edge (125) and a second lower edge (not shown) opposite the second upper edge. The second lower edge couples to an interior of the second elongated compartment and the second upper edge is coupled to a second visor (205) by a second clip (151). Both the first and second retractable substrates cover a significant portion of a windshield (201) while in the deployed state. Both the first and second retractable substrates comprise a retracting bias force with the respective elongated compartment such that when one or both retractable substrates are not coupled to the respective visor the retractable substrates will retract and roll back in the elongated compartment. One having skill in the art will appreciate that the first and second elongated compartments can be swapped in the vehicle and the sunshade will function similarly.

Figure 3:
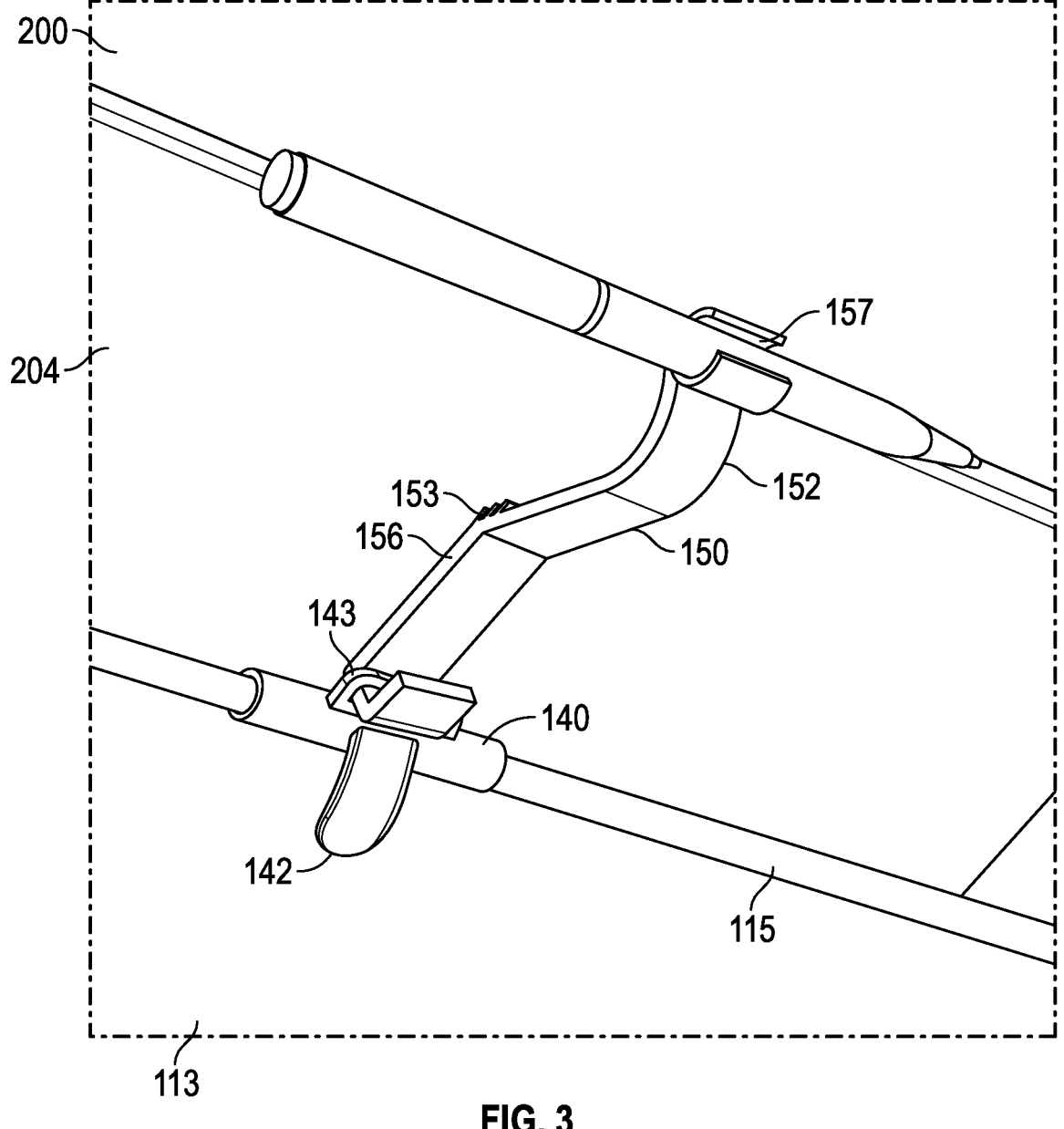
FIG. 3 shows a close-up view of the retractable substrate coupled to a visor of the vehicle according to the first illustrated embodiment.

FIG. 3 shows a close-up view of the retractable substrate coupled to a visor of the vehicle (200). The retractable substrate comprises a first retractable substrate (113) having a first upper edge (115). Coupled to the first upper edge is a first attachment component (140). The first attachment component comprises a catch (143) and a finger grip (142). The catch is detachably coupled to a first clip (150) which allows the first retractable substrate to remain in the deployed state with a presence of a retracting bias force. The finger grip allows an operator to easily raise and lower the first retractable substrate with a single finger. The first clip is attached to a first visor (204) of the vehicle. The first clip comprises a curved body (152) extending from a first endpoint (153) to a second endpoint (not shown). A hook (156) is coupled to the first endpoint wherein the hook extends through the catch of the first attachment component. The curved body wraps around the first visor wherein the first endpoint and the second endpoint are disposed on opposite surfaces of the first visor. A pen holder (157) is disposed on the curved body. A second clip may comprise similar structure to that of the first clip.

Figure 4:
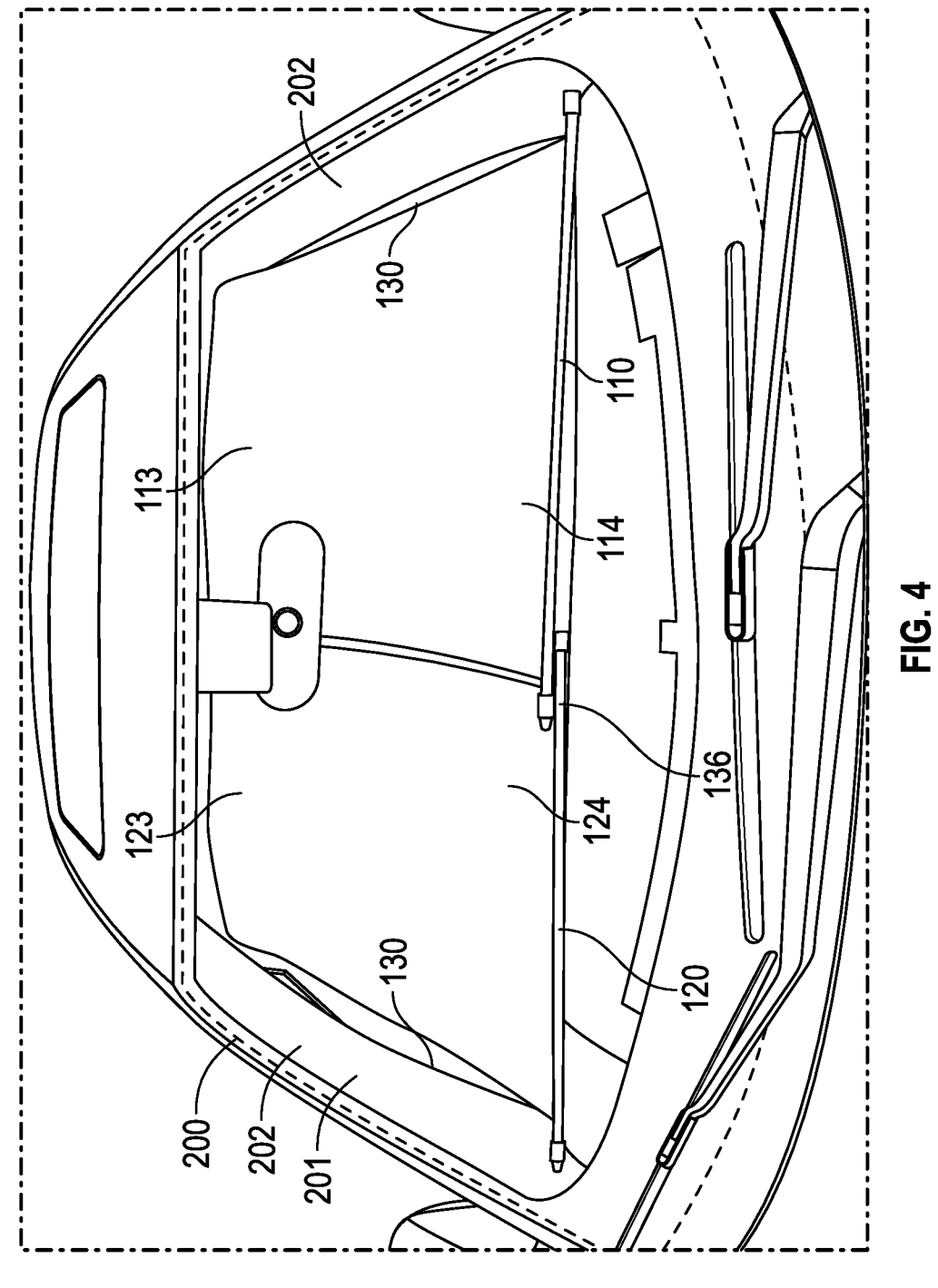
FIG. 4 shows an exterior view of the sunshade disposed in the vehicle with the retractable substrates in the deployed state according to the first illustrated embodiment.

FIG. 4 shows an exterior view of the sunshade (100) disposed in the vehicle (200) with retractable substrates in a deployed state (132). The sunshade comprises a first elongated compartment (110) slidably coupled with a second elongated compartment (120). A first retractable substrate (113) and a second retractable substrate (114) are deployed from the first elongated compartment and the second elongated compartment, respectively. As shown, the first and second retractable substrates cover a majority portion of a windshield (201) of the vehicle. The first retractable substrate comprises a first reflective surface (114) and the second retractable substrate comprises a second reflective surface (115). The first and second reflective surfaces are configured to reflect sunlight and heat away from the vehicle. The first and second retractable substrates overlap in order to ensure sufficient coverage near a center of the windshield. The overlap of the retractable substrate is achieved by a compartment overlap (136) of the first and second elongated compartments. Both the first and second retractable substrates comprise a tapered side (130) near an associated windshield pillar (202) of the vehicle in order to have better conformity with conventional windshield and windshield pillar angled designs.

Figure 5:
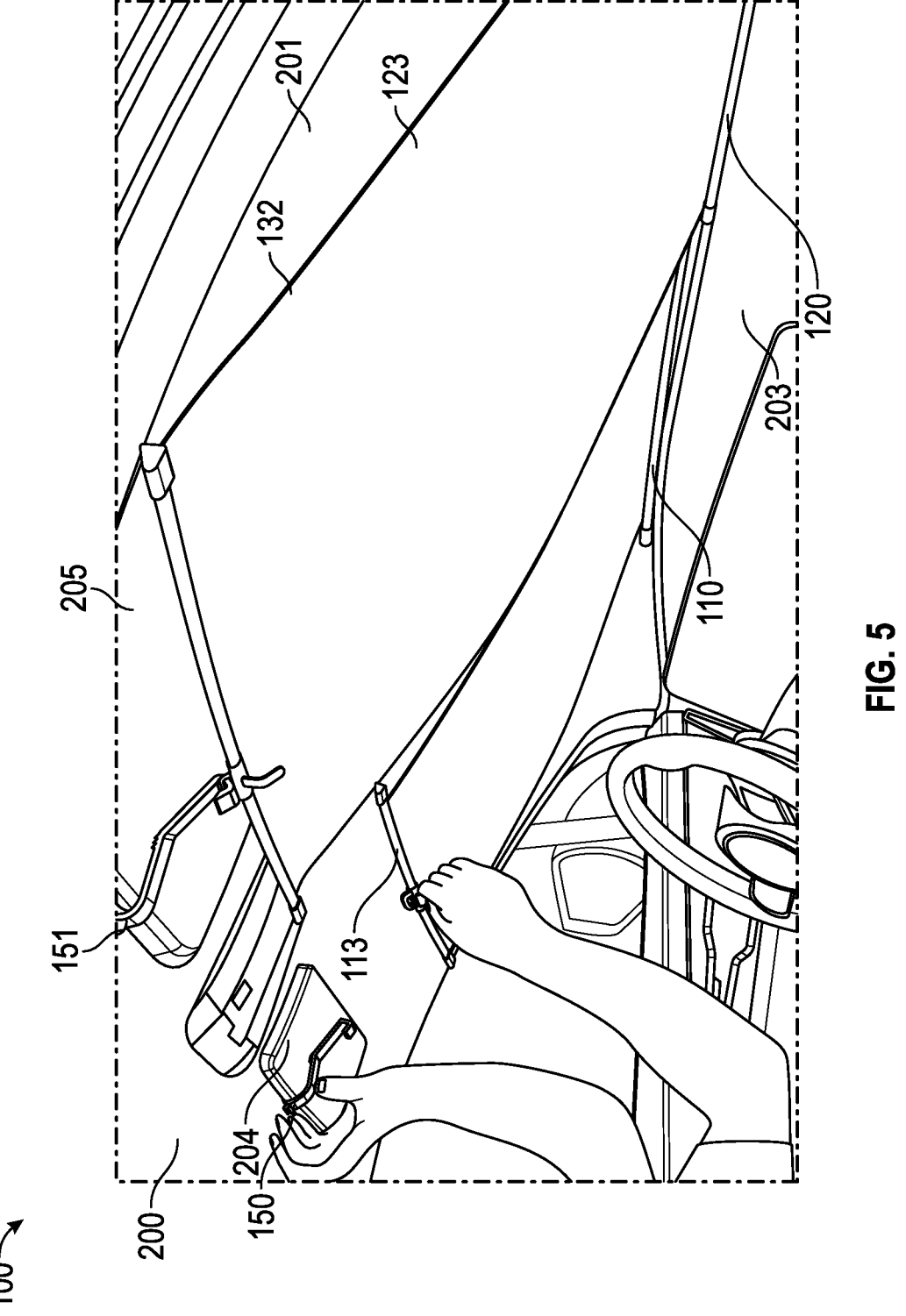
FIG. 5 shows an interior view of the sunshade with one of the retractable substrates transitioning from the deployed state into the retracted state according to the first illustrated embodiment.

FIG. 5 shows an interior view of the sunshade (100) with one of the retractable substrates transitioning from the deployed state (132) into the retracted state (131). The sunshade comprises a collapsible body (101) having a first elongated compartment (110) and a second elongated compartment (120) configured to linearly slide along each other. The second elongate compartment comprises a second retractable substrate (123) in the deployed state where the second retractable substrate is coupled to a second visor (205) of a vehicle by a second clip (151) attached therewith. The first elongated compartment comprises a first retractable substrate (113) transitioning from the deployed state to the retracted state. An operator is lowering the first retractable substrate by holding an attachment component and guiding the first retractable substrate into the first elongated compartment with aid of a retractable bias force within the first elongated compartment. The retractable bias force can be achieved by a torsion spring, a coil spring, or any other mechanical component configured to have a bias force that retracts and winds the retractable substrates inside the elongated compartments.

Figure 6:
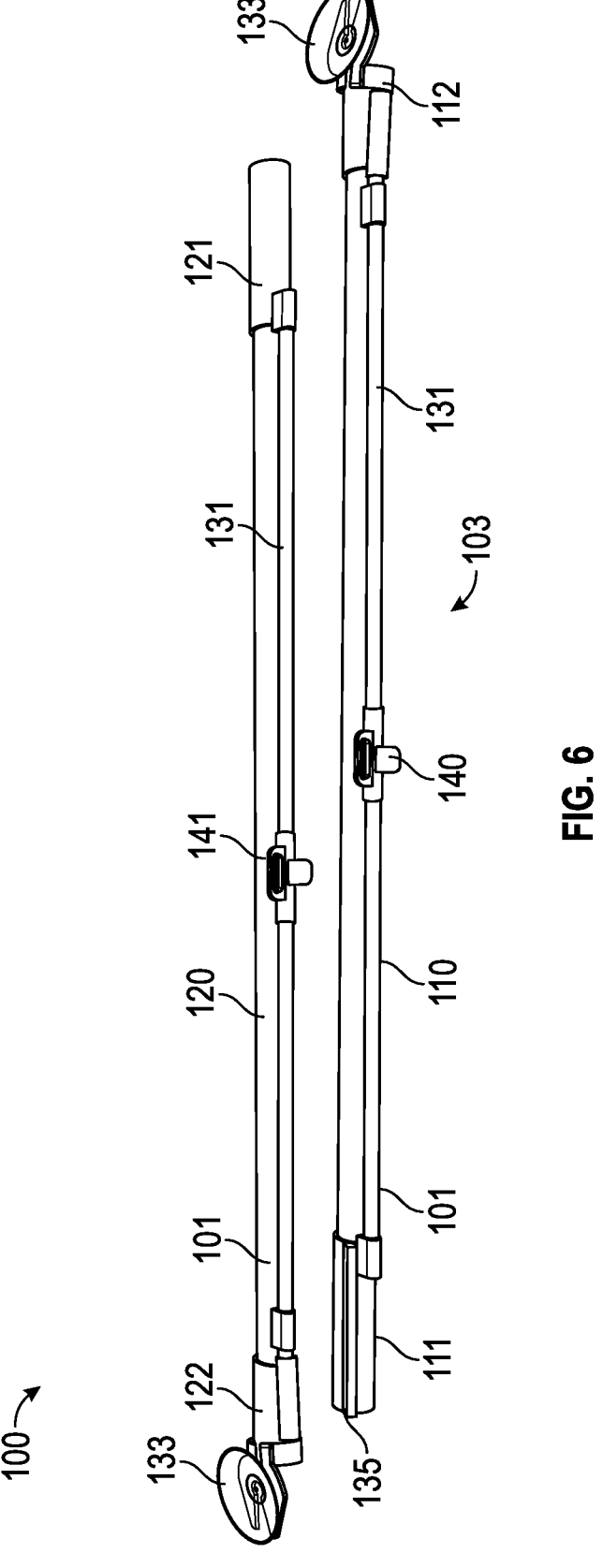
FIG. 6 shows a top view of the sunshade according to the first illustrated embodiment.

FIG. 6 shows a top view of the sunshade (100). The sunshade comprises a first elongated compartment (110) and a second elongated compartment (120) shown in a detached configuration. The first elongated compartment comprises a first inner end (111) and a first outer end (112) opposite the first inner end. The second elongated compartment comprises a second inner end (121) and a second outer end (122) opposite the second inner end. Each of the first and second outer ends comprise a coupler element (133) configured to engage with a windshield or windshield pillar of a vehicle. The first and second elongated compartments each comprise a retractable substrate (not shown) wound within an interior of the respective elongated compartment. Each of the retractable substrates comprises an attachment component (140; 141) which is externally accessible while the retractable substates are in a retracted state. The first elongated compartment and the second elongated compartment are in approximate vertical alignment such that when coupled together would be characterized as being in a collapsed configuration (103). The collapsed configuration allows for each easy transportation and storage. Some operators choose to leave the sunshade continuously on a dashboard.

The sunshade (100) further comprises a glass breakage point (135) disposed on the first inner end (111) of the first elongated compartment (110). The glass breakage point allows the sunshade be used during an emergency to break through a window of the vehicle. The glass breaking point can be additionally disposed on the second inner end (121) of the second elongated compartment (120).

Figure 7:
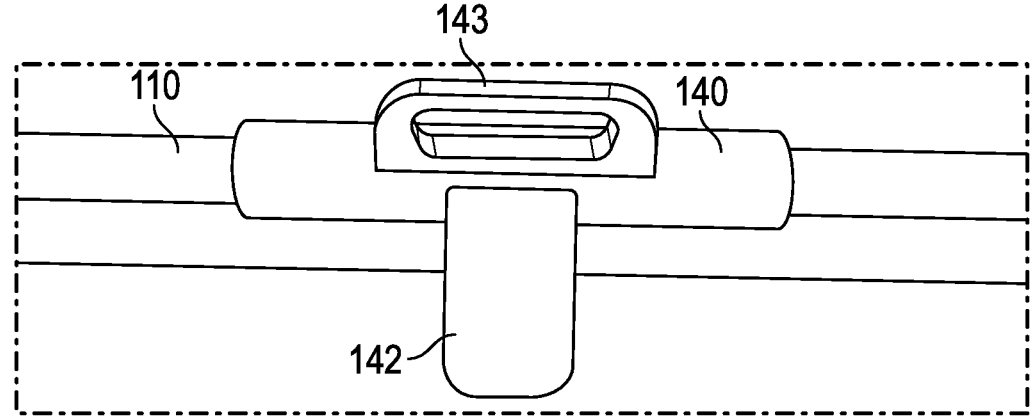
FIG. 7 shows a close-up view of an attachment component according to the first illustrated embodiment.

FIG. 7 shows a close-up view of the attachment component (140). The attachment component is coupled to a first elongated compartment (110) via a retractable substrate (not shown) nested within the first elongated compartment. The attachment component comprises a catch (143) and a finger grip (142) where the catch is configured to engage with a clip to maintain the retractable substrate in a deployed state. The attachment component is externally accessible while the retractable substrate is retracted within the first elongated compartment.

Figure 8:
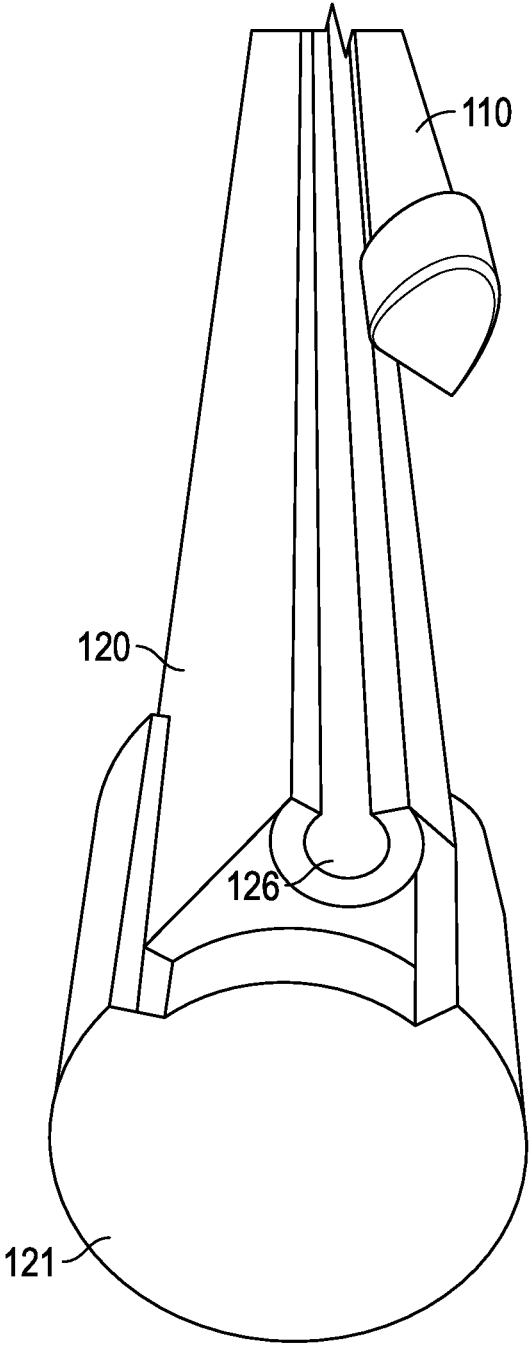
FIG. 8 shows a close-up view of an elongated compartment according to the first illustrated embodiment.

FIG. 8 shows a close-up view of an elongated compartment. The elongated compartment comprises a second elongated compartment (120) having a groove (126) extending along a portion thereof. A first elongated compartment (110) comprises a corresponding tongue to attain a tongue and groove coupling between the first and second elongated compartments. The tongue and groove coupling is one example of a slidable and linear engagement between the first and second elongated compartments. The linear slidable feature allows for the sunshade to fit various sized vehicles. Other mechanisms for achieving a slidable engagement between the elongated compartments may also be utilized as can be appreciated by one having skill in the art.

Figure 9:
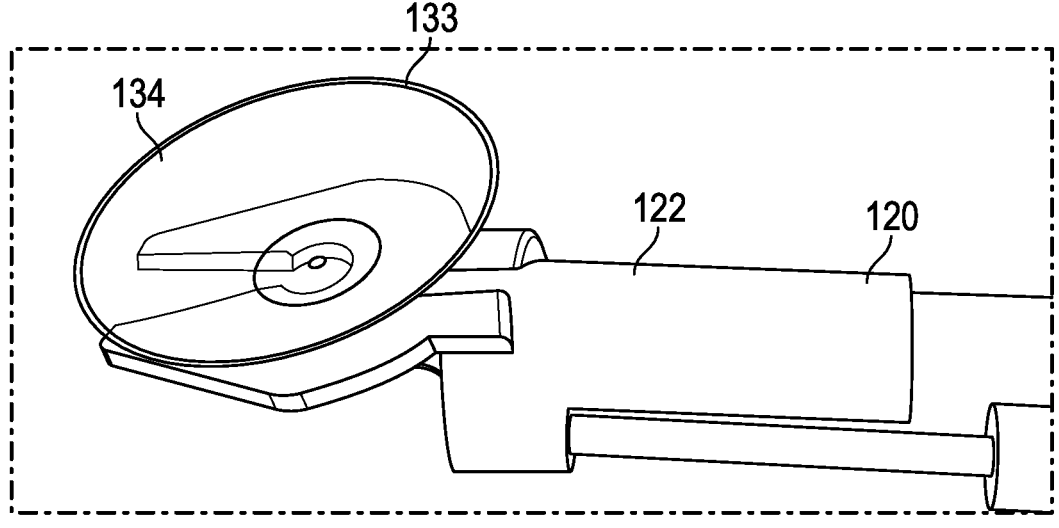
FIG. 9 shows a close-up view of a coupler element according to the first illustrated embodiment.

FIG. 9 shows a close-up view of the coupler element (133) according to the first illustrated embodiment. The coupler element is disposed at a second outer end (122) of a second elongated compartment (120). A similar coupler element can be coupled to a first outer end of a first elongated compartment. The coupler element comprises a suction cup (134) for engaging with a windshield of a vehicle. Other coupler elements have may also be utilized by one having skill in the art to engage with a portion of a vehicle including windshield, dashboard, and windshield pillar. Examples of other coupler elements include, but not limited to Velcro and tension bar. The coupler element may comprise an adhesive by itself or in conjunction with another coupler element disclosed for fixedly coupling the sunshade to the vehicle at the windshield, dashboard, windshield pillar, or other structure.

Figure 10:
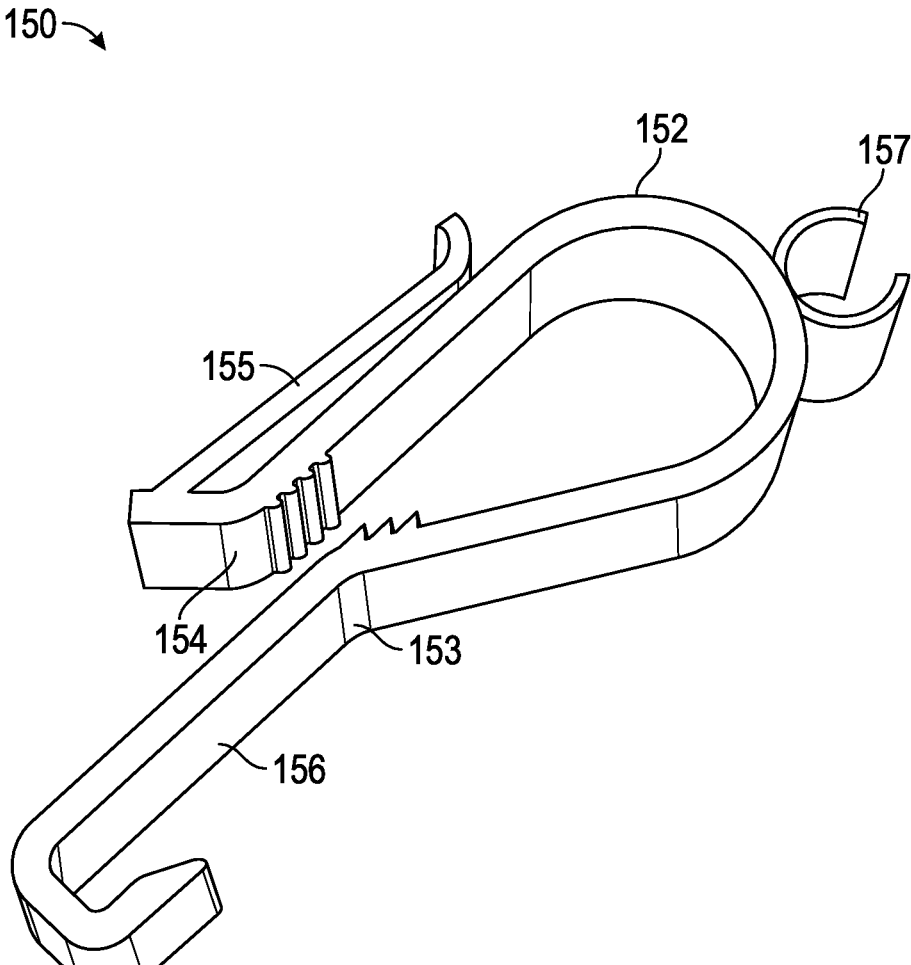
FIG. 10 shows a perspective view of a clip according to the first illustrated embodiment.

FIG. 10 shows a perspective view of a clip (150) according to the first illustrated embodiment. The clip comprises a curved body (152) extending from a first endpoint (153) to a second endpoint (154) wherein the curved body tapers inward toward the first and second endpoints. A paper holder (155) is coupled to the second endpoint for holding thin objects. A pen holder (157) is disposed on the curved body between the first and second endpoints. A hook (156) is coupled to the first endpoint. The hook is configured to engage with a catch of an attachment component for holding a retractable substate in a deployed state.

FEATURE LIST sunshade (100)
collapsible body (101)

expanded configuration (102)
collapsed configuration (103)
first elongated compartment (110)
first inner end (111)
first outer end (112)
first retractable substrate (113)
first reflective surface (114)
first upper edge (115)
second elongated compartment (120)
second inner end (121)
second outer end (122)
second retractable substrate (123)
second reflective surface (124)
second upper edge (125)
groove (126)
tapered side (130)
retracted state (131)
deployed state (132)
coupler element (133)
suction cup (134)
glass breaking point (135)
compartment overlap (136)
first attachment component (140)
second attachment component (141)
finger grip (142)
catch (143)
first clip (150)
second clip (151)
curved body (152)
first endpoint (153)
second endpoint (154)
paper holder (155)
hook (156)
pen holder (157)
vehicle (200)
windshield (201)
windshield pillar (202)
dashboard (203)
first visor (204)
second visor (205)

What is claimed is:

1. A sunshade, comprising:
a collapsible body having a first elongated compartment and a second elongated compartment connected to and slidable within a groove of the first elongated compartment, the first elongated compartment extends longitudinally from a first inner end to a first outer end opposite the first inner end, and the second elongated compartment extends longitudinally from a second inner end to a second outer end opposite the second inner end;
a plurality of retractable substrates comprising;
a first retractable substrate coupled to the first elongated compartment, the first retractable substrate configured to retract within and deploy from the first elongated compartment, the first retractable substrate comprising a first attachment component coupled to a first upper edge of the first retractable substrate, and
a second retractable substrate coupled to the second elongated compartment, the second retractable substrate configured to retract within and deploy from the second elongated compartment, the second retractable substrate comprising a second attachment component coupled to a second upper edge of the second retractable substrate.

2. The sunshade of claim 1, wherein the first elongated compartment is configured to translate linearly along the second elongated compartment.

3. The sunshade of claim 1, further comprising a coupler element coupled to each of the first outer end and the second outer end, the coupler element of the first outer end and the coupler element of the second outer end are each configured to fixedly couple to a portion of a vehicle.

4. The sunshade of claim 3, wherein each of the coupler elements comprises a suction cup.

5. The sunshade of claim 1, wherein each of the plurality of retractable substrates comprises a tapered side.

6. The sunshade of claim 1, wherein deployment of each of the plurality of retractable substrates over a windshield of a vehicle comprises deploying each of the plurality of retractable substrates upwards from one of the first elongated compartment or the second elongated compartment to a visor of said vehicle, thereby covering said windshield.

7. The sunshade of claim 6, wherein each of the first elongated compartment and the second elongated compartment are configured to couple to a dashboard of said vehicle.

8. A sunshade kit, comprising:
a first elongated compartment extending longitudinally from a first inner end to a first outer end opposite the first inner end;
a second elongated compartment extending longitudinally from a second inner end to a second outer end opposite the second inner end, the second elongated compartment configured to connect to and be slidable within a groove of the first elongated compartment;
a first retractable substrate coupled to the first elongated compartment, the first retractable substrate configured to retract within and deploy from the first elongated compartment, the first retractable substrate comprising a first attachment component coupled to a first upper edge of the first retractable substrate;
a second retractable substrate coupled to the second elongated compartment, the second retractable substrate configured to retract within and deploy from the second elongated compartment, the second retractable substrate comprising a second attachment component coupled to a second upper edge of the second retractable substrate; and
a first clip and a second clip.

9. The sunshade kit of claim 8, further comprising a coupler element coupled to each of the first outer end and the second outer end, the coupler element of the first outer end and the coupler element of the second outer end are each configured to fixedly couple to a portion of a vehicle.

10. The sunshade kit of claim 8, wherein deployment of the first retractable substrate over a windshield of a vehicle comprises deploying the first retractable substrate from the first elongated compartment to a visor of said vehicle, and further wherein deployment of the second retractable substrate over the windshield comprises deploying the second retractable substrate from the second elongated compartment to the visor, thereby covering said windshield.

11. The sunshade kit of claim 10, wherein each of the first elongated compartment and the second elongated compartment are configured to couple to a dashboard of said vehicle.

12. A system of a sunshade installed within a vehicle, the system comprising:
a first clip coupled to a first visor of the vehicle;
a second clip coupled to a second visor of the vehicle; and
a dashboard of the vehicle supporting the sunshade, the sunshade comprising:

a collapsible body having a first elongated compartment and a second elongated compartment connected to and slidable within a groove of the first elongated compartment, the first elongated compartment extends longitudinally from a first inner end to a first outer end opposite the first inner end, and the second elongated compartment extends longitudinally from a second inner end to a second outer end opposite the second inner end, a first retractable substrate coupled to the first elongated compartment, the first retractable substrate configured to retract within and deploy from the first elongated compartment, the first retractable substrate comprising a first attachment component coupled to a first upper edge of the first retractable substrate, and a second retractable substrate coupled to the second elongated compartment, the second retractable substrate configured to retract within and deploy from the second elongated compartment, the second retractable substrate comprising a second attachment component coupled to a second upper edge of the second retractable substrate, wherein the first attachment component is coupled to the first clip, and the second attachment component is coupled to the second clip.

13. The system of claim 12, wherein each of the first clip and the second clip comprises a curved body extending from a first endpoint to a second endpoint, the clip further comprising a hook disposed at the first endpoint.

14. The system of claim 13, wherein each of the first attachment component and the second attachment component comprises a catch.

15. The system of claim 14, wherein the catch of the first attachment component and the second attachment component engages with the hook of the first clip and the second clip, respectively.

16. The system of claim 12, further comprising a compartment overlap between the first elongated compartment and the second elongated compartment wherein the first retractable substrate overlaps with the second retractable substrate when in a deployed state.

17. The system of claim 12, wherein the first retractable substrate overlaps with the second retractable substrate while in a deployed state.

18. The system of claim 12, further comprising a coupler element coupled to each of the first outer end and the second outer end, the coupler element of the first outer end and the coupler element of the second outer end are each configured to fixedly couple to a portion of a vehicle.

19. The system of claim 12, wherein deployment of the first retractable substrate over a windshield of the vehicle comprises deploying the first retractable substrate from the first elongated compartment to the first visor of said vehicle, and further wherein deployment of the second retractable substrate over the windshield comprises deploying the second retractable substrate from the second elongated compartment to the second visor, thereby covering said windshield.

20. The system of claim 19, wherein each of the first elongated compartment and the second elongated compartment are configured to couple to the dashboard of said vehicle.

* * * * *